United States Patent [19]
Tye

[11] Patent Number: 6,082,393
[45] Date of Patent: Jul. 4, 2000

[54] EMERGENCY SHUTOFF VALVE EXERCISER FOR STEAM TURBINE AND METHODS FOR INSTALLING AND OPERATING SAME

[76] Inventor: Randy G. Tye, 25123 Kingsdown, Spring, Tex. 77389

[21] Appl. No.: 09/170,750

[22] Filed: Oct. 13, 1998

Related U.S. Application Data

[60] Provisional application No. 60/062,618, Oct. 22, 1997.

[51] Int. Cl.⁷ ................................................. F16K 43/00
[52] U.S. Cl. .......................... 137/315; 137/495; 251/89; 251/90
[58] Field of Search ................................. 251/89, 74, 90, 251/91, 82, 83, 129.03, 128; 137/315, 495

[56] References Cited

U.S. PATENT DOCUMENTS

| | | | |
|---|---|---|---|
| 1,385,058 | 7/1921 | Warter | 251/82 |
| 1,399,470 | 12/1921 | Enger | 251/89 X |
| 2,061,028 | 11/1936 | Forbes et al. | 251/128 |
| 2,070,661 | 2/1937 | Hughes | 137/495 |
| 2,568,052 | 9/1951 | Catranis | 251/285 |
| 2,859,639 | 11/1958 | Bryant | 74/625 |
| 3,042,061 | 7/1962 | Dobrikin | 137/495 |
| 3,129,603 | 4/1964 | Natho | 251/128 X |
| 3,137,474 | 6/1964 | Soderberg et al. | 137/495 |
| 3,302,661 | 2/1967 | Williams | 251/128 X |
| 3,867,956 | 2/1975 | Ibragimov et al. | 137/495 X |
| 3,941,349 | 3/1976 | Pierson | 251/129.03 X |
| 4,379,544 | 4/1983 | Angelo et al. | 251/74 |
| 5,622,205 | 4/1997 | Petersen | 251/82 X |

Primary Examiner—Stephen M. Hepperle
Assistant Examiner—John Bastianelli
Attorney, Agent, or Firm—Felsman, Bradley, Vaden, Gunter & Dillon LLP

[57] ABSTRACT

An apparatus for exercising an emergency shutoff valve of a steam turbine and methods for installing and operating the same. A frame of the apparatus mounts on top of an emergency shutoff valve body and spans the axis of a valve stem of the emergency shutoff valve. A plunger is suspended from the frame and connects to the top of the valve stem of the emergency shutoff valve. The emergency shutoff valve, which is biased to spring closed, is held in place by the apparatus. With the valve thus secured, the tripping mechanism for the emergency shutoff valve can be disconnected from the valve stem and exercised, tested, or serviced. Additionally, the valve stem can be moved or exercised to assure its operability and to dislodge deposits or corrosion from the valve stem. Movement of the plunger is limited by retainer means that restrict movement of the plunger relative to the frame. By this arrangement, the valve stem can be exercised through a predetermined range of motion without risk of substantially interrupting the flow of steam through the emergency shutoff valve.

12 Claims, 4 Drawing Sheets

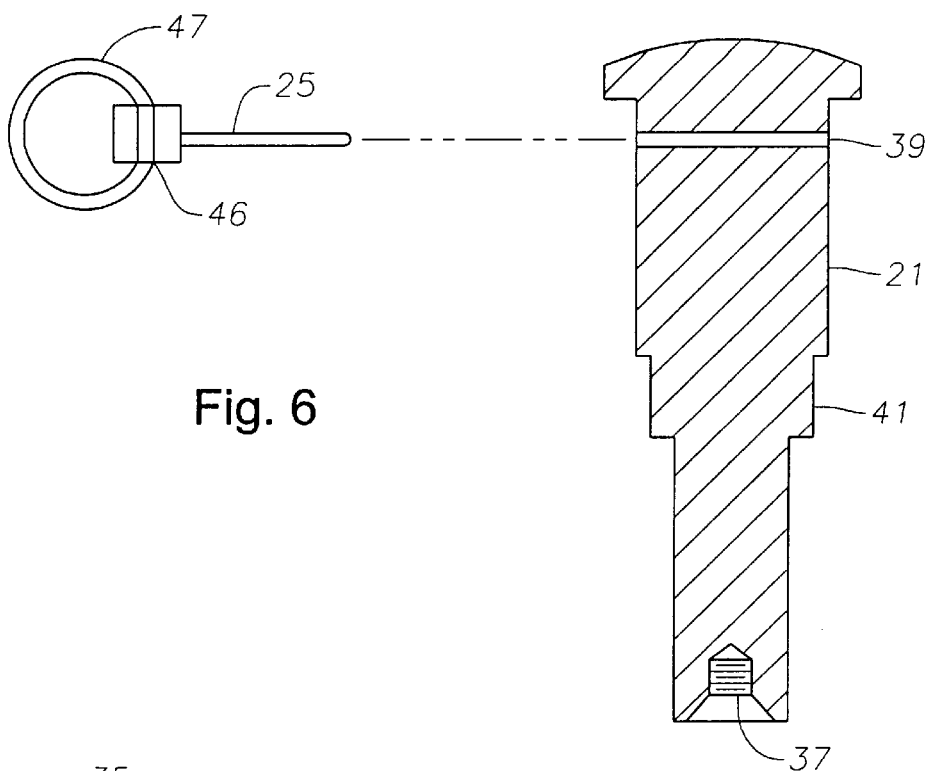
Fig. 6
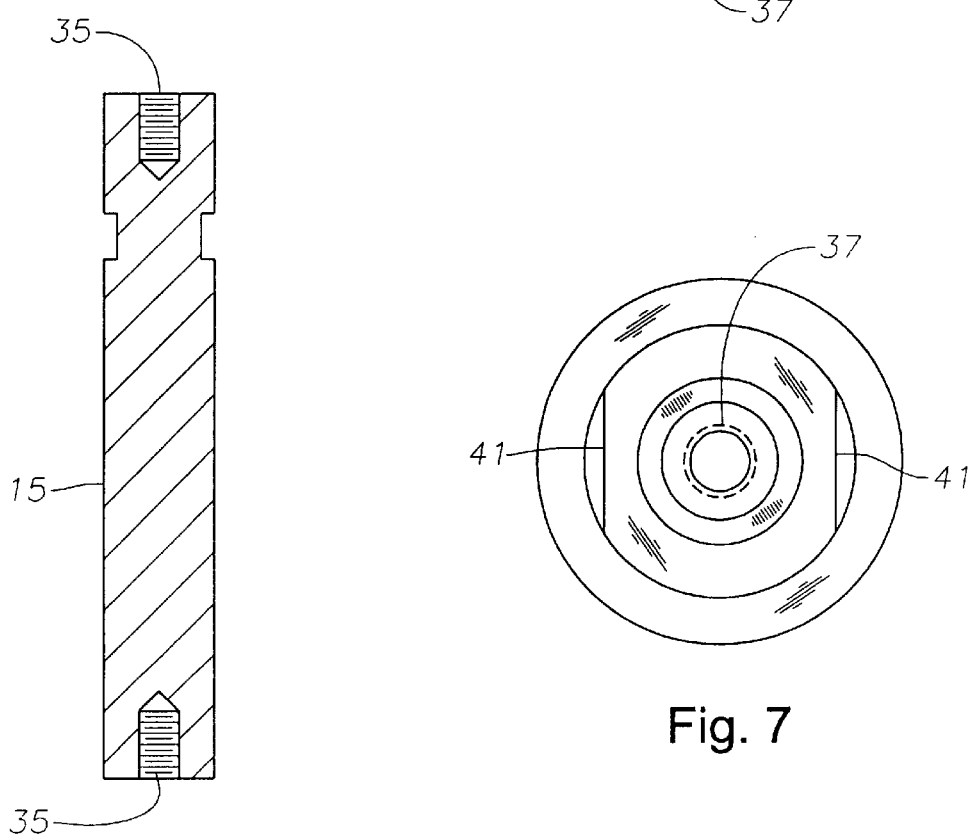
Fig. 5
Fig. 7

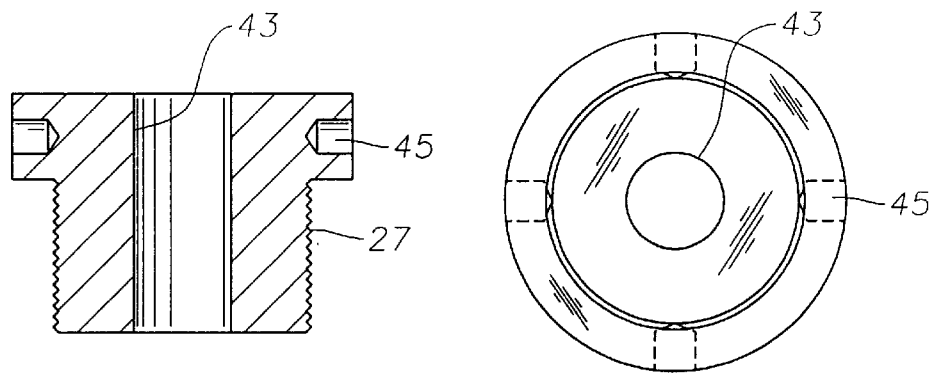
Fig. 8
Fig. 9
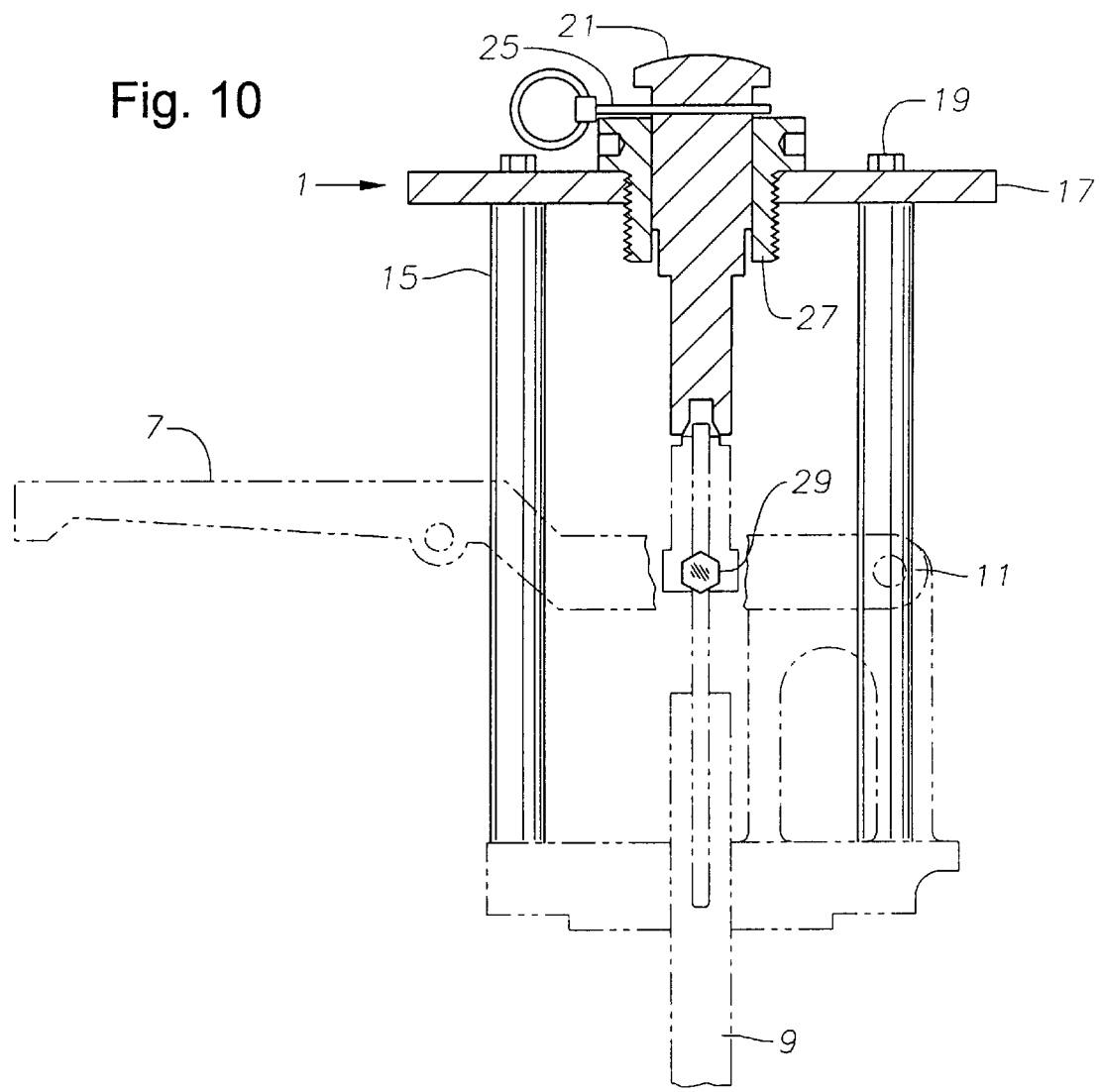
Fig. 10

EMERGENCY SHUTOFF VALVE EXERCISER FOR STEAM TURBINE AND METHODS FOR INSTALLING AND OPERATING SAME

This application claims the benefit of U.S. Provisional No. 60/062,618, filed Oct. 22, 1997.

BACKGROUND OF THE INVENTION

1. Field of the Invention

The present invention relates to an exerciser for a steam turbine emergency shutoff valve for steam turbines manufactured by Elliott Co., frame sizes AYR, BYR, BYRH, BYRHH, CYR, DYR, and E-Line turbines with standard Elliott trip systems.

2. Background of the Invention

The emergency shutoff valve, or trip valve, is used on the above mentioned steam turbines to shut off the flow of steam, which is the power source for the turbine, in case of an overspeed condition of the turbine or in some cases, when the unit is set up, for a low oil pressure condition. These turbines are used as general purpose power supplies throughout refineries, chemical plants, power plants and other areas where steam is generated for heating.

The goal of long term runs, more than one year, has been desired due to lost production when the turbines are shut down, man power required to go through the procedure of transferring production to another source, and the potential of causing damage to the turbine during shut down and start-up.

The problems that these emergency shutoff valves have are that they will not always operate properly when a situation such as overspeed or low oil pressure requires that the steam flow is shut off. When the turbine is run for more than one year, in some cases less time, there are contaminants from the steam treatments that will collect around the area where a valve stem of the emergency shutoff valve engages the body of the valve. Another area that is a concern is the hinge pin connection of a resetting lever to the valve mechanism. This hinge pin for the emergency shutoff valve is subjected to all weather related problems and in some cases chemical corrosion and over time will seize up due to a lack of movement.

Since the emergency shutoff valve operates during a turbine emergency, the fact that it will not always operate is a major safety concern within the plants that operate them. These units have actually exploded and caused death due to overspeed conditions for various reasons such as improper methods of trying to check this device. The only safe way to check this system currently, is to shut the turbine down and move the components by hand and then start the turbine back up. It is impossible to safely move these parts during operation with the existing design.

To insure proper operation of the components of an emergency shutoff valve, the parts need to be "exercised." An exerciser consists of a number of components that are assembled on the existing emergency shutoff valve and provide a means for an operator to move the problem components in a controlled manner. An exerciser will also allow the operator to shut off the flow of steam to the turbine during exercising of the valve components in case the turbine starts to go into an overspeed condition or any other emergency occurs. There is currently no exerciser known in the art for the Elliott Co. steam turbines listed above.

Therefore, it is evident that presently the emergency shutoff valve cannot predictably and safely be maintained without temporarily removing the turbine from service. Removal of the turbine from service is disruptive and counterproductive for the businesses depending on the turbine to meet energy needs. The present invention provides a means for extending the uninterrupted run times of a turbine through safe and effective exercising of the shutoff valve. Therefore, the present invention will significantly increase the uninterrupted run times of the subject turbines.

Steam turbine valves have much higher corrosion potential because of the environment surrounding the component materials. Operators of steam turbines are likely to have more confidence in corrosive-resistant material components than those materials that are more conducive to corrosion. Serviceability of the turbine valves is much easier when corrosion is not present, or is reduced. Accordingly, components such as an emergency shutoff valve exerciser are affected less by corrosion if composed of corrosive-resistant materials.

OBJECTS AND ADVANTAGES

In response to these deficiencies in the art, it is an object of the present invention to provide an improved apparatus and method for exercising an emergency shutoff valve of a steam turbine for the purpose of removing steam deposits that may impede the movement of the shutoff valve.

It is a further object to provide an improved apparatus and method for exercising an emergency shutoff valve that enables predictable and reliable exercising. Such predictability ensures the safest means possible for exercising the valve.

It is a further object to provide an improved apparatus and method for exercising an emergency shutoff valve that allows the shutoff valve to be held in an open position while an overspeed trip mechanism is tested. Such an implementation of the exerciser provides for testing of the trip mechanism without shutting down the turbine and encourages frequent testing of the trip mechanism.

It is a further object to provide an improved apparatus and method for exercising an emergency shutoff valve that allows for the shutoff valve to be engaged during the testing process. Therefore, if an overspeed condition is encountered during the testing process, the operator can manually activate the shutoff valve.

It is a further object to provide an improved apparatus for exercising an emergency shutoff valve that is easily installed on a steam turbine. Easy installation will encourage turbine users to employ the improved and safer emergency shutoff valve.

It is a further object to provide an improved apparatus for holding an emergency shutoff valve in an open position while knife edge linkages of the emergency shutoff valve are serviced or replaced.

It is yet another object to provide an improved apparatus and method for exercising an emergency shutoff valve that resists corrosion so that turbine users will have more confidence in the functionality of the improved apparatus and method for exercising the emergency shutoff valve. Corrosion resistance will also ease serviceability of the improved apparatus.

Further objects and advantages of the present invention will become apparent from a consideration of the drawings and ensuing description.

SUMMARY OF THE INVENTION

The objects described above, as well as other objects and advantages are achieved by an improved apparatus for exercising components of an emergency shutoff valve of a steam turbine. A frame that is connected to the body of the steam turbine shutoff valve provides a platform from which the components of the emergency shutoff valve exerciser are supported. The frame supports a plunger that is attached to the upper end of a valve stem. The plunger provides a vertical extension of the valve stem by which the valve stem can be vertically reciprocated by the vertical reciprocation of the plunger that extends up through the frame. A retainer is provided for that engages both the frame and the plunger and restricts the motion of the plunger relative to the frame. The retainer is positionable at selected locations to allow the range of motion of the plunger to be controlled.

In a preferred embodiment, an upper member of the frame has a threaded opening for receiving a threaded annular adjustment member and the plunger. The annular adjustment member is therefore vertically adjustable in the threaded opening of the upper member of the frame. Thus, when the annular adjustment member is engaged with the plunger, by turning the annular adjustment member the annular adjustment member is advanced in the threaded opening of the frame and the plunger moves relative to the frame.

In a preferred embodiment, the upper portion of the frame consisting of a plate is installed at a desired height and is supported on top of two or more legs that are connected to the body of the steam turbine shutoff valve. This plate has a threaded opening to allow installation of the annular adjustment member and plunger. The legs are drilled and tapped on both ends so that they can be secured in position on the steam valve body and to the plate. The holes on top of the legs will accept bolts that pass through holes in the plate in order to secure the plate on top of the legs.

In a preferred embodiment, the top of the plunger is rounded to fit properly in the palm of the operators hand and not leave sharp edges that could injure the operator during the exercising of the valve stem. Additionally, this shape allows the operator to push down on the plunger firmly when needed without causing injury to the operator. A hole is drilled in the plunger transverse to its longitudinal axis for receiving a pin that holds the plunger in position and will restrict the movement of the plunger during the exercising operation. By installing a pin into the plunger through the hole drilled transverse to the plunger's longitudinal axis, the plunger will only have a range of movement of approximately ¼ inch. This movement is restricted by interference of the pin with the frame.

In a preferred embodiment, the plunger is slidably engaged in an annular adjustment member and the plunger has a transverse hole for a pin. During installation, an adjusting nut is installed on the annular adjustment member below the frame so the annular adjustment member's up and down motion will be restricted to approximately ¼ inch. Therefore, movement of the plunger and valve stem will also be restricted to approximately ¼ inch up and down. Because the annular adjustment member bears against the pin in the plunger, removal of the pin still allows for quick release of the plunger in case of an emergency during exercising of the valve stem. The approximate ¼ inch of movement will not be enough to restrict flow of steam into the turbine and cause reduction of turbine operation.

Installation of the emergency shutoff valve exerciser requires that the resetting arm be removed from the valve stem by removing two blocks that hold an H-block that is connected to the valve stem from the resetting arm. Thereby, the resetting arm is free to move relative to the valve stem. The existing holes in the resetting arm must be drilled and tapped to provide a means to insert removable bolts that can release the H-block when removed. Installation continues by: removing two or more steam body cover bolts and installing studs; installing two or more support legs onto the studs; installing the plate on top of the legs and installing the annular adjustment member nut into the plate; and installing the plunger through the annular adjustment member and attaching to the trip valve stem by connecting the threads together on the stem and plunger. This will provide for movement of the valve stem by movement of plunger.

In a preferred method of operating the exerciser, insert a pin into the plunger through the hole. Turn the adjusting nut so that it will move vertically down the preset amount of approximately ¼ inch. Loosen or remove the two bolts that are holding the H-block in place. This will allow approximately ¼ inch vertical movement of the valve stem and resetting arm. The pin will not allow the stem to travel more than the desired amount. After the stem and resetting arm have been exercised to operator satisfaction, reposition the resetting arm, move adjusting nut up approximately ¼ inch, and insert the bolts into the tapped holes. Remove the pin to put the emergency trip valve back into standard operating position.

In another preferred embodiment, the method of operating the stem and arm is by lifting and pushing the stem and arm with a vertical motion.

The trip mechanism can be tested during operation with the valve held in position during operation, although this should never be attempted by increasing the speed of the turbine.

In case of an emergency or for any reason the operator may decide to shut the unit off, he may simply remove the pin from the plunger and push the plunger down. This will shut the valve off and stop the flow of steam through the turbine.

In a preferred embodiment, the invention can be employed to service or replace a set of knife edges while the valve is held in an open position. The knife edges are parts of the trip mechanism linkage. The knife edges overlap slightly with one knife edge being supported atop the other but allowing lateral slippage therebetween. When the lower knife edge that is attached to the trip mechanism moves in response to an overspeed condition, the other knife edge slips off of the top of the lower knife edge and the shutoff valve springs to the closed position.

In a preferred embodiment, elements of the emergency shutoff valve exerciser, where practical, are composed of stainless steel, which has enhanced corrosive-resistant properties. The use of stainless steel allows for easier serviceability of the emergency shutoff valve parts, which are corrosive-resistant. Additionally, stainless steel is aesthetically more pleasing to operators of the emergency shutoff valve, thus instilling confidence in the functionality of the valve.

BRIEF DESCRIPTION OF THE DRAWINGS

In the drawings, wherein like reference characters are used throughout to describe like parts:

FIG. 5 is an elevation view of a leg of the frame.

FIG. 6 is an elevation view of the plunger, pin and pull-ring.

FIG. 7 is a plan view of the bottom of the plunger.

FIG. 8 is an elevation view of an annular adjustment member.

FIG. 9 is a plan view of the bottom of the annular adjustment member.

FIG. 10 is an elevation view of an emergency shutoff valve exerciser.

DETAILED DESCRIPTION OF THE INVENTION

Figure 1:
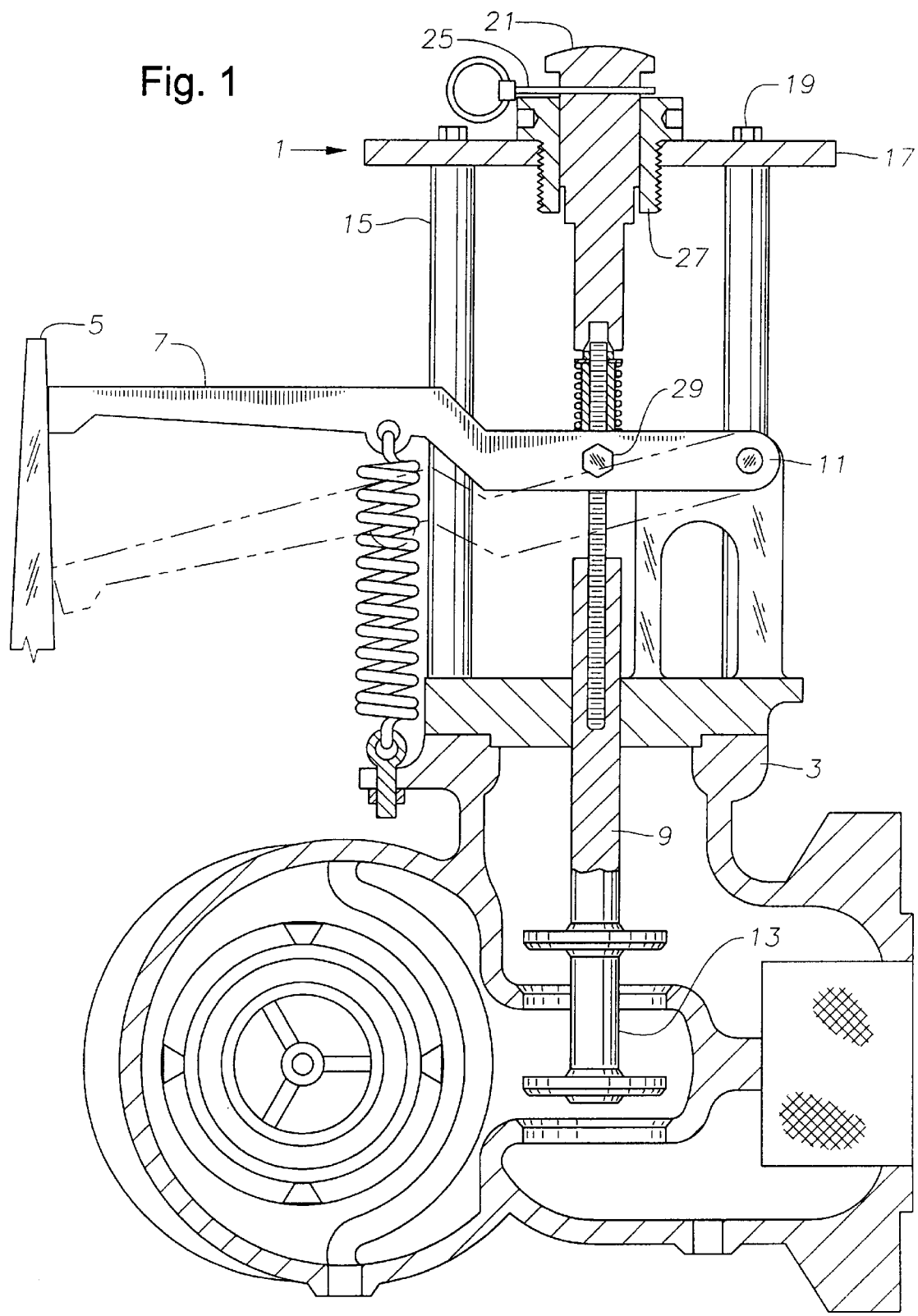
FIG. 1 is an elevation view of an emergency shutoff valve exerciser that also shows, in ghost lines, a cross section of a steam turbine and steam turbine shutoff valve.
Figure 3:
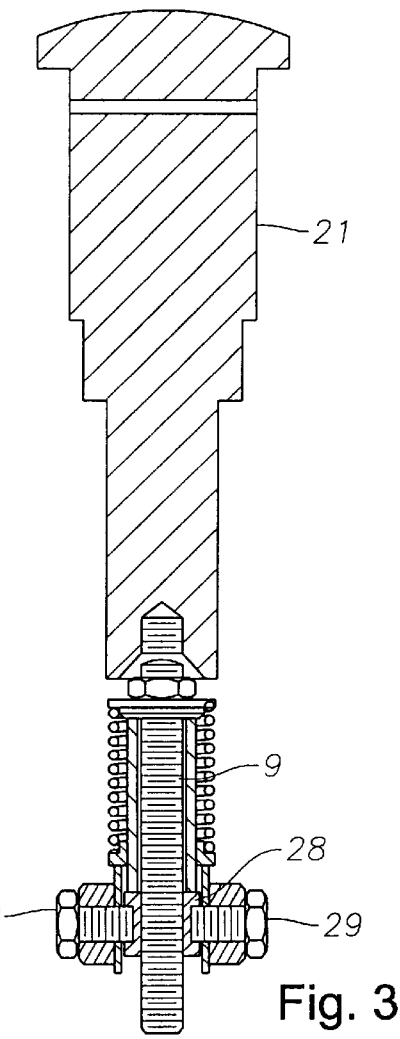
FIG. 3 is a cross-sectional elevation view of an upper portion of a valve stem of the shutoff valve and also shows a plunger connected to the top of the valve stem.
Figure 4:
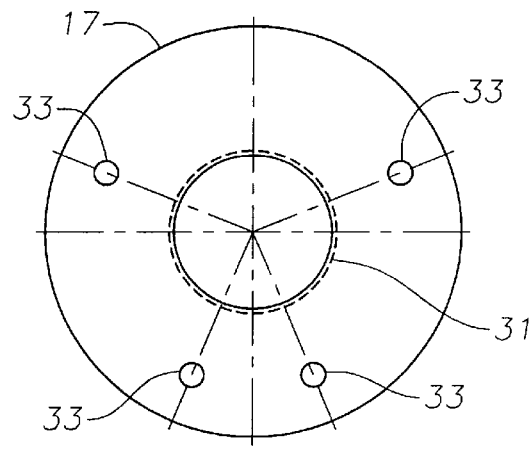
FIG. 4 is a plan view of an upper member of the frame.

A preferred embodiment of the emergency shutoff valve exerciser is shown in FIG. 1. A frame 1 is shown mounted on top of the body of the steam turbine shutoff valve 3. The frame is made up of an upper member 17 mounted to legs 15, with the legs connected to the upper member by bolts 19. FIG. 4 shows the upper member 17 with a threaded opening 31 near its center through which an annular adjustment member 27 and a plunger 21 extend. Holes 33 through which bolts 19 pass to connect the legs of the frame to the upper member are also shown. The plunger as shown in FIGS. 6 and 7 has a threaded hole 37 at its lower end that engages the upper end of valve stem 9 as shown in FIG. 1 and FIG. 3. The threaded hole 37 is beveled at its opening to allow for easier initial engagement and subsequent re-engagement with the valve stem 9. The plunger has a transverse hole 39 through which a pin 25 may engage the plunger and thus provide interference between the movement of the plunger 21 and the annular adjustment member 27. The pin 25 has a top piece which has an axial hole 46 for connection to a pull-ring 47. Thus, to remove the pin 25 one need only pull the pull-ring 47. FIG. 1 also shows a valve 13 of the emergency shutoff valve suspended from the valve stem 9. Additionally, a resetting lever 7 and an arm 5 of a trip mechanism are shown. The hinge pin connection 11 of the resetting lever 7 to the valve mechanism is also shown in FIG. 1.

Figure 2:
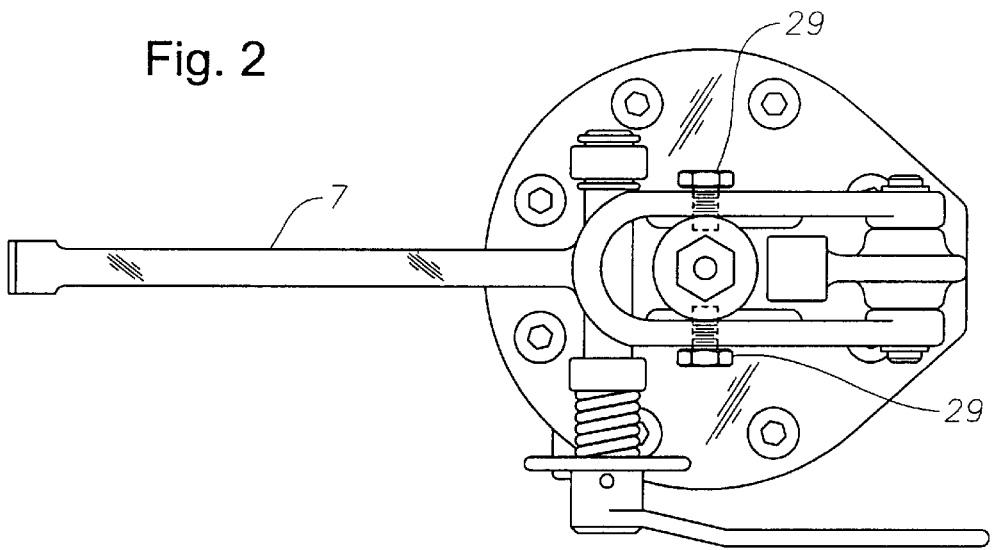
FIG. 2 is a plan view of a steam turbine shutoff valve with the emergency shutoff valve exerciser removed for clarity.

FIGS. 2 and 3 show the removable engagement of the resetting lever 7 with the valve stem 9 via an H-block 28 and bolts 29. By removing bolts 29, the valve stem 9 and plunger 21 are released to vertically reciprocate independent of the position of the resetting lever.

FIG. 5 more clearly shows a leg 15 of the frame 1.

FIGS. 6 and 7 show plunger 21, pin 25 and pull-ring 47, and include illustrations of machined flats 41 that are useful in grasping and rotating the plunger with a wrench.

FIGS. 8 and 9 show annular adjustment member 27 with hole 43 through which the plunger passes, and grasping holes 45 that are employed to rotate the annular adjustment member.

To install frame 1, remove existing cap bolts from body 3 of the shutoff valve. Install studs up through holes left by cap bolts. Remove the hinge pin from hinge pin connection 11. This will allow resetting lever 7 to be removed. Remove existing H-block pins. Drill and tap existing holes in the resetting lever for bolts 29. Install bolts 29 into resetting lever. Assemble resetting lever back onto existing system. Check for approximate 0.010 clearance between bolts 29 and H-block. Install the hinge pin back onto structure.

Install legs 15 onto studs by using threaded holes 35. Install upper member 17 by using bolts 19 with lock washers through holes 33. Bolts 19 will thread into the legs 15 at threaded holes 35.

Install annular adjustment member 27 into upper member 17. Turn threads using grasping holes 45 until annular adjustment member is ¼ inch from top of upper member 17. Install a jam nut on bottom side of annular adjustment member 27 and set annular adjustment member into locked position. This will give a controlled amount of movement during operation of the Exerciser.

Set nut on top of valve stem 9 leaving approximately ½ inch of threads exposed. Install plunger 21, through hole 43 of annular adjustment member 27. Attach plunger 21 to valve stem 9 by using threads 37 of plunger 21. Lock plunger onto the valve stem by using machined flats 41 on plunger.

To operate the exerciser, install pin 25 into hole 39 of plunger. Remove bolts 29 from resetting lever 7. This will allow resetting lever to pivot on hinge connection 11 during operation of the turbine since valve 13 is being held open by pin 25. Lower annular adjustment member 27 approximately ¼ inch by using holes 45. This will allow movement of valve stem 9 ¼ inch by using top of plunger.

In case of an emergency, plunger pin 25 can be quickly removed by pulling on the pull-ring 47 and valve stem 9 can be closed by pushing downwardly. This will close valve 13 stopping the flow of steam into the turbine.

Once all components of the trip system are determined to be operational, the turbine can be returned to standard operation by locking resetting lever 7 back into its normal horizontal position and turning the annular adjustment member back into position approximately ¼ inch above plate 17 by using holes 45. Install bolts 29 back into position. Remove plunger pin 25 from plunger.

What is claimed is:

1. An emergency shutoff valve exerciser for a valve steam of an emergency shutoff valve of a steam turbine, comprising:

a frame connected to the body of the steam turbine shutoff valve for supporting the components of the emergency shutoff valve exerciser;

a plunger matingly attached to the upper end of the valve stem of the emergency shutoff valve and fitting through said frame for enabling vertical reciprocal movement of the valve stem by vertical reciprocal movement of said plunger; and a retainer engaged with said plunger and engaged with said frame for restricting the vertical reciprocal movement of said plunger relative to said frame so that exercising of the valve stem is limited to a selected range of motion;

wherein said frame includes an upper member with a threaded opening for receiving said retainer and said plunger, said retainer and plunger being concentrically engaged with one another.

2. An emergency shutoff valve exerciser for a valve steam of an emergency shutoff valve of a steam turbine, comprising:

a frame connected to the body of the steam turbine shutoff valve for supporting the components of the emergency shutoff valve exerciser;

a plunger matingly attached to the upper end of the valve stem of the emergency shutoff valve and fitting through said frame for enabling vertical reciprocal movement of the valve stem by vertical reciprocal movement of said plunger; and a retainer engaged with said plunger and engaged with said frame for restricting the vertical reciprocal movement of said plunger relative to said frame so that exercising of the valve stem is limited to a selected range of motion;

wherein said frame includes two or more legs connecting at their respective lower ends to the body of the steam turbine shutoff valve and a plate connected to the respective upper ends of said two or more legs, said plate having an opening through which said plunger movably extends.

3. An emergency shutoff valve exerciser in accordance with claim 2 wherein said two or more legs are drilled and tapped at their respective lower ends for receiving bolts that pass through a portion of the body of the steam turbine shutoff valve and the upper ends of each leg have a threaded hole for receiving a bolt.

4. An emergency shutoff valve exerciser in accordance with claim 3 wherein said plate connected to the upper ends of said two or more legs has holes aligning with said two or more legs through which bolts pass to engage the threaded holes in the upper ends of each leg.

5. An emergency shutoff valve exerciser in accordance with claim 2 wherein said plunger has a hole transverse to its longitudinal axis for receiving a pin for restricting the movement of said plunger relative to said retainer.

6. An emergency shutoff valve exerciser in accordance with claim 5 wherein said retainer includes:

an annular adjustment member with its outer surface threaded to engage the threads of the threaded opening in said frame and thereby through rotation of the ring cause movement of said annular adjustment member relative to said frame; and a pin for insertion in the hole in said plunger transverse to the longitudinal axis of said plunger for restricting the movement of said plunger relative to said annular adjustment member, and thereby providing a means for releasing said plunger relative to said frame without adjusting said annular adjustment member.

7. An emergency shutoff valve exerciser in accordance with claim 6 wherein said pin includes a top portion and a stem portion, said stem portion being receivable in the hole in said plunger, and said top portion having a hole for receiving a pull-ring.

8. An emergency shutoff valve exerciser in accordance with claim 6 wherein said retainer includes an adjustment nut that threadedly engages said annular adjustment member below said frame for marking the limit of the desired movement of said annular adjustment member relative to said frame.

9. An emergency shutoff valve exerciser in accordance with claim 1 wherein said plunger has a rounded top that may be pushed down firmly by an operator without causing injury to the part of the operator's body being used to push said plunger down and thereby facilitating unencumbered operation of the emergency shutoff valve.

10. An emergency shutoff valve exerciser in accordance with claim 1 wherein said plunger has a hole transverse to its longitudinal axis for receiving a pin for restricting the movement of said plunger relative to said frame.

11. An emergency shutoff valve exerciser in accordance with claim 10 wherein said retainer is a pin for insertion into the transverse hole thereby restricting movement of said plunger relative to said frame.

12. An emergency shutoff valve exerciser in accordance with claim 11 wherein said pin has a stem portion and a top portion, said stem portion is receivable within said transverse hole of said plunger, and said top portion has a hole perpendicular to said stem portion for receiving a pull-ring.

* * * * *